United States Patent [19]
Stuck

[11] Patent Number: 5,328,161
[45] Date of Patent: Jul. 12, 1994

[54] ROTATABLE REPAIR APPARATUS

[76] Inventor: Andrew G. Stuck, 2627 Birchwood Ave., Appleton, Wis. 54914

[21] Appl. No.: 80,676

[22] Filed: Jun. 21, 1993

Related U.S. Application Data

[63] Continuation of Ser. No. 783,576, Oct. 28, 1991, abandoned.

[51] Int. Cl.⁵ .............................................. B25B 1/00
[52] U.S. Cl. ..................................... 269/17; 269/296; 269/287; 269/909
[58] Field of Search ................. 269/17, 130, 155, 287, 269/296, 302, 329, 909, 55, 58; 114/224

[56] References Cited

U.S. PATENT DOCUMENTS

| | | | |
|---|---|---|---|
| Re. 33,930 | 5/1992 | Ardent | 269/296 |
| 1,236,246 | 8/1917 | Anelung | 269/296 |
| 1,288,138 | 12/1918 | Nicoson | 269/296 |
| 2,182,743 | 12/1939 | Clergy | 269/17 |
| 2,301,019 | 11/1942 | Couse | 269/17 |
| 2,742,635 | 4/1956 | Capps | 269/287 |
| 4,307,877 | 12/1981 | Rogos | 269/17 |
| 4,491,307 | 1/1985 | Ellefson | 269/55 |

FOREIGN PATENT DOCUMENTS 1007838 4/1977 Canada ............................. 269/287

Primary Examiner—Bruce M. Kisliuk
Assistant Examiner—Eileen P. Morgan
Attorney, Agent, or Firm—Andrus, Sceales, Starke & Sawall

[57] ABSTRACT

An apparatus for repairing articles, such as jet skis, and including a pair of rings which are disposed in a parallel, spaced relation and connected together by a group of braces of adjustable length. Each ring is provided with a pair of flats, and the flats on one ring are oriented with the flats on the other ring. A support member extends generally chordwise across each ring, and is provided with a recess or cradle, and the ends of the water ski are received within the respective recesses. A clamping member, such as a rachet take-up belt, is associated with each ring and clamps the end of the jet ski against the respective support member. The jet ski in an upright condition is clamped to the respective support members and the rings are then manually rotated to invert the jet ski and enable the lower surfaces of the ski to be worked on. Engagement of the flats with the supporting surface maintains the rings in a position such that the jet ski is upright or inverted.

9 Claims, 2 Drawing Sheets

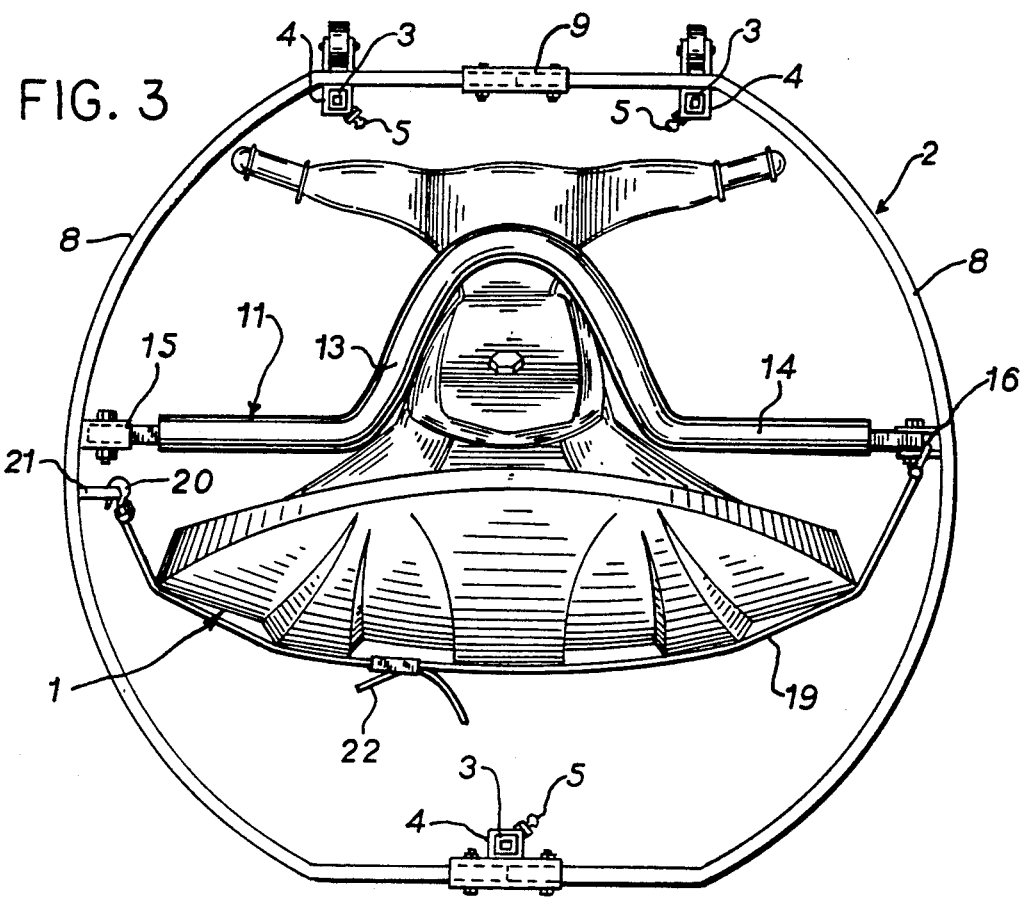
FIG. 3
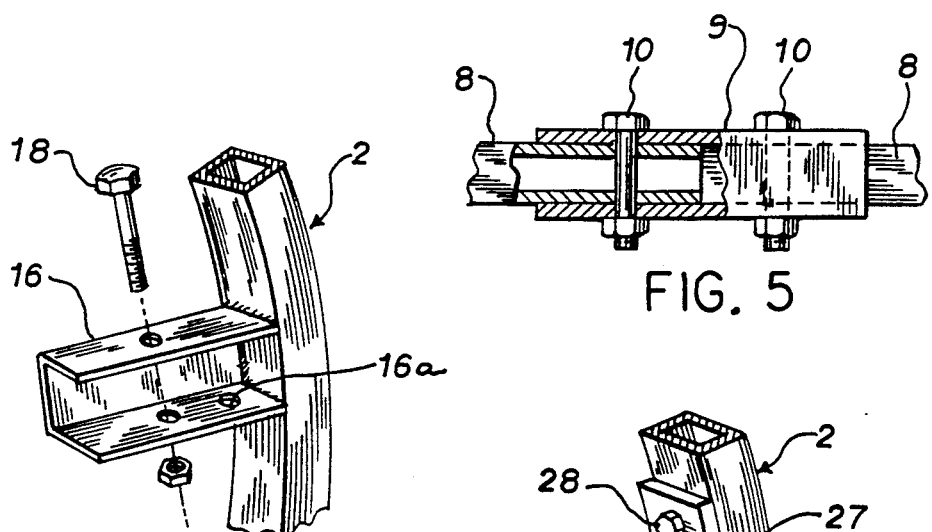
FIG. 4
FIG. 5
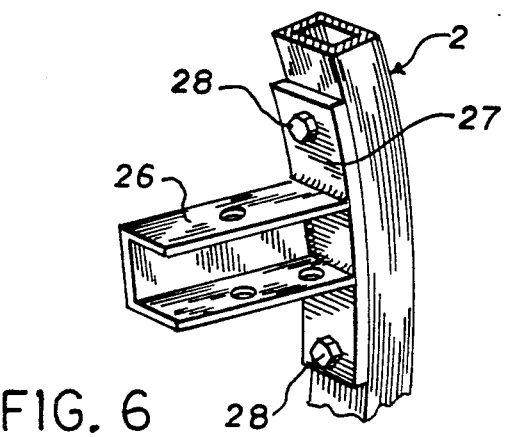
FIG. 6

ROTATABLE REPAIR APPARATUS

This application is a continuation of Ser. No. 07/738,576, filed Oct. 28, 1991, now abandoned.

BACKGROUND OF THE INVENTION

The typical jet ski includes a fiberglass body, and occasionally the under surface of the body or the mechanical drive components on the lower surface of the body need repair. It is a very difficult procedure to repair the under surface of the body of a jet ski when the ski is in an upright position, so it is often necessary to invert the jet ski so that the lower surface faces upwardly in a position where it is accessible to a workman. However, a jet ski weighs in the range of about 300 to 450 pounds, so that it is difficult to manually invert the jet ski and, due to the presence of the handle bars, the foam padding on the handle bars, and the throttle linkage, the jet ski can not be maintained in an inverted position without auxiliary support. In the past, attempts have been made to invert the jet ski and then rest the inverted jet ski on a cushion, such as a pile of discarded automobile tires. However, it is awkward to manually invert the jet ski and position it on the cushioning tires. Moreover, it has been found that the tires will not adequately protect the handle bars, the foam padding on the handle bars, and the throttle linkage from damage when the jet ski is in the inverted position.

SUMMARY OF THE INVENTION

The invention is directed to an rotary apparatus for repairing articles, such as jet skis, small boats, snowmobiles and the like. The apparatus includes a pair of axially aligned rings, which are disposed in a spaced, parallel relation, and the rings are connected by a series of braces of adjustable length, so that the distance between the rings can be varied as desired to accommodate the article being repaired.

Each ring is provided with a pair of flats, with the flats on one ring being oriented circumferentially with the flats on the other ring.

A supporting member or brace extends generally chordwise across each ring, and at least one of the supporting members is provided with a recess or cradle. In addition, a clamping member, such as a rachet-type take-up belt, is associated with each supporting member.

In operation, the jet ski, in an upright position, is located within the rings, with the ends of the jet ski being disposed beneath and adjacent to the respective supporting members. The clamping members are then actuated to clamp the ends of the jet ski against the respective supporting members. With the jet ski firmly connected to the rings, the rings are then rotated manually 180° to thereby invert the jet ski and enable the lower surfaces of the jet ski body or the mechanical components on the lower surface to be conveniently serviced by a workman.

The flats on the rings are positioned relative to the support members so that the flats will prevent free rotation of the rings when the jet ski is in both the upright and inverted positions.

The invention provides a simple and inexpensive apparatus for inverting a cumbersome article, such as jet ski, or other watercraft, and maintaining the jet ski in either an inverted or upright position. In the inverted position, the jet ski is supported solely by the supporting members which engage the ends of the ski, so that there is no possibility of damage to the handle bars, foam padding, or throttle linkages of the jet ski.

The apparatus is adjustable in length to accommodate different lengths of jet skis or other article to be serviced. In addition, the supporting members are removably connected to the rings and supporting members of different configurations or shapes can be employed to accommodate different configurations of jet skis.

To facilitate handling, storage and shipment of the apparatus, the rings are preferably composed of at least two semi-circular sections which are removably connected together. By disassembling the rings, the apparatus can be shipped in a more compact package.

While the apparatus has particular application for the repair of jet skis, it is contemplated that it can also be used for the repair of other water craft, snowmobiles or other articles.

Other objects and advantages will appear in the course of the following description.

DESCRIPTION OF THE DRAWINGS

The drawings illustrate the best mode presently contemplated of carrying out the invention.

In the drawings

FIG. 3 is an end view of the apparatus as shown in FIG. 1;

FIG. 4 is a perspective view of a connection of one of the ends of the support members to the rings;

FIG. 5 is an enlarged fragmentary view showing the connection of the rings sections together; and FIG. 6 is a perspective view of a modified form of the connecting member or bracket.

DESCRIPTION OF THE ILLUSTRATED EMBODIMENT

Figure 1:
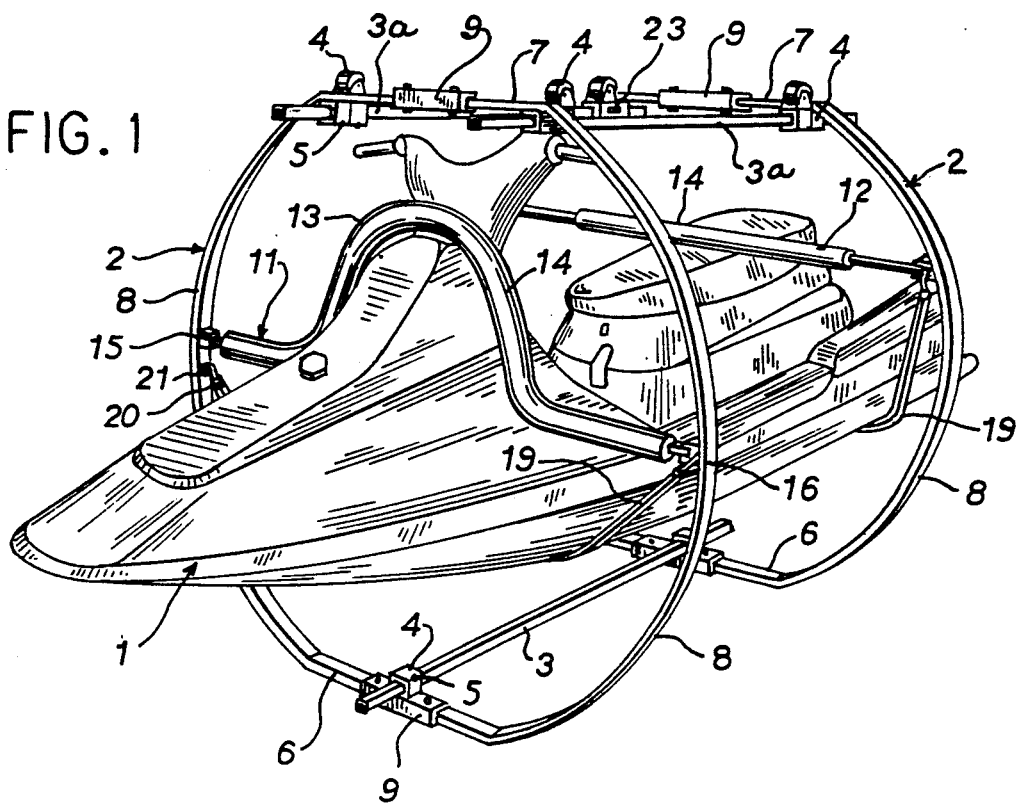
FIG. 1 is a perspective view of the apparatus, showing the jet ski positioned in an upright position.

The drawings illustrate a rotary apparatus for repairing an article such as a jet ski 1, or other watercraft. However, it is contemplated that the apparatus can also be employed to repair or service other water craft, snowmobiles or other such equipment.

The apparatus includes a pair of spaced, parallel axially aligned rings 2 which are connected together by a series of tubular connecting bars 3 which have a generally rectangular cross-section. Tubular sleeves 4 are connected to the inner surface of each ring 2 and the connecting bars or rails 3 are mounted for sliding movement within the sleeves 4 and can be locked to the sleeves by thumb screws 5. By loosening the thumb screws, the sliding connection between the connecting bars 3 and sleeves 4 permits the rings 2 to be moved toward and away from each other, to thereby accommodate jet skis of different lengths.

As illustrated, each ring 2 is provided with a pair of straight sections or flats 6 and 7. The flats of each ring are located diametrically opposite to each other, and the flats on one ring are oriented circumferentially with the flats on the other ring. In the receiving position in which the jet ski is mounted within the rings, as shown in FIG. 1, flats 6 are in contact with the ground and thus prevent the free rotation of the rings on the ground.

It is contemplated that rings 2 can be composed of two semi-circular sections 8 which are removably connected together. In this regard, the corresponding abutting ends of the sections 8 are received within a tube 9 and are secured within the tube by a pair of bolts 10, as seen in FIG. 5. Rings 2 are severed at the flat areas 6 and 7. By forming each ring 2 of a pair of semi-circular sections 8, handling, storage and transporting of the rings is facilitated.

To secure the ends of the jet ski 1 to the respective rings 2, a support bar 11 extends generally chordwise across one of the rings while a corresponding support bar 12 is associated with the other ring 2. As best seen in FIG. 3, support bar 11 is provided with a recess or cradle 13, which receives the forward end of the jet ski. The other support bar 12, associated with the opposite ring, can be generally straight, as shown in the drawings, or can be formed with a corresponding cradle, depending upon the shape of the jet ski or the configuration of the rear end of the jet ski to be repaired. Both support bars 11 and 12 are provided with an outer layer 14 formed of a material such as foam rubber or plastic, which will cushion and prevent damage to the jet ski.

To connect the support bars 11 and 12 to rings 2, a tubular member 15 is connected to the inner surface of each ring and an end of the respective support bar 11, 12 is received within the tubular member. At the opposite end, an open-sided sleeve 16 is secured to the inner surface of the ring and, as best seen in FIG. 4, the sleeve has an open side which receives the opposite end of the respective support bar. The end of the support bar is secured within the open-ended sleeve by a bolt 18.

The respective ends of the jet ski are secured or clamped against the support bars 11, 12 by a clamping mechanism which can take the form of a pair of rachet-type take up belts or straps 19. As best shown in FIG. 3, the ends of each belt 19 carry hooks 20, one hook being engaged with hole 16a on member 16, and the other hook is secured to eye 21 on ring 2. The take-up belt is a conventional type, having a lever 22 which, when operated, will actuate a rachet to decrease or shorten the length of the belt and thereby clamp the jet ski against the support bars 11 and 12, as shown in FIG. 1.

Figure 2:
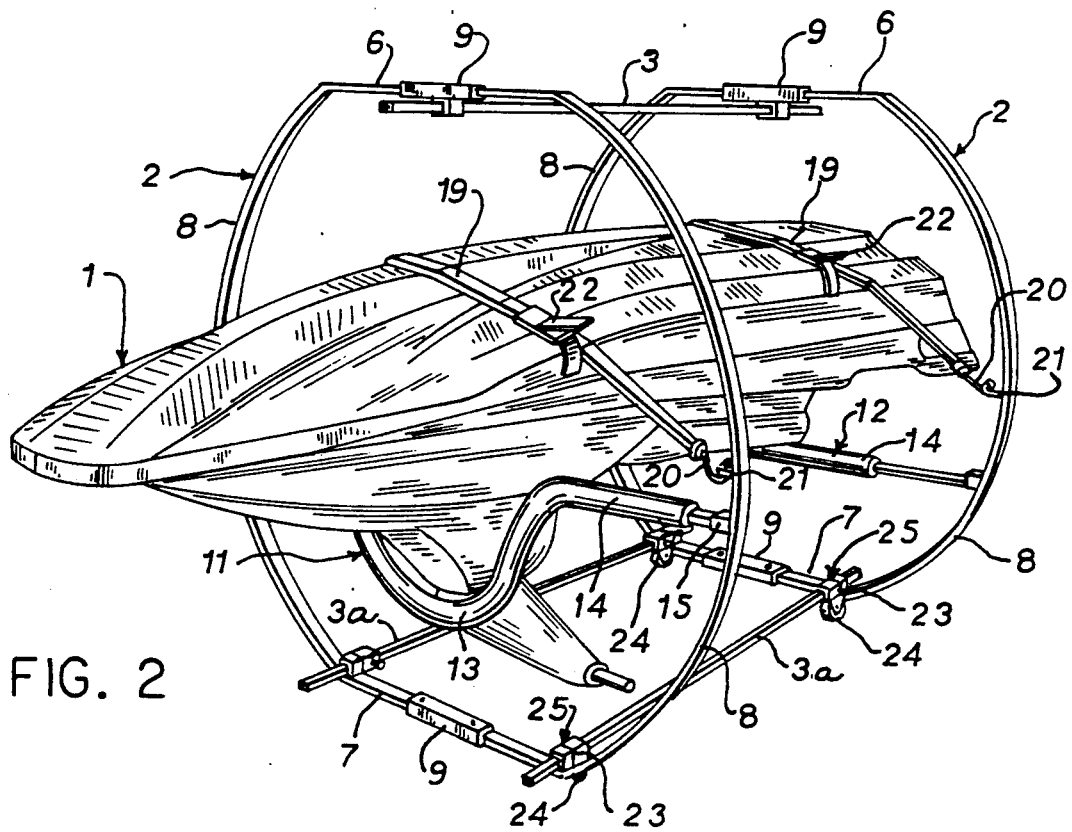
FIG. 2 is a view similar to FIG. 1, showing a jet ski in an inverted position.

Brackets 23 are attached to connecting bars 3a and each bracket rotatably supports a wheel 24. The shafts of wheels 24 are located normal or perpendicular to bars 3a, and are adjustably connected to bars 3a by thumb screws 25. When the rings 2 are rotated to invert the jet ski 1, as shown in FIG. 2, wheels 24 will rest on the ground or foundation and will permit the entire unit to be readily moved over the ground. As the wheels 24 are fixed in orientation, the wheels will not hinder rotation of rings 2.

FIG. 6 shows a modification of the apparatus in which a removable channel-shaped bracket or connecting member 16 is utilized in place of the fixed member 15. In this embodiment, connecting member 26 is welded endwise to curved plate 27, which in turn, is attached to ring 2 through bolts 28. With this construction, the connecting members 26 can be attached at different locations to rings 2 to accommodate different sizes and configurations of jet skis or other watercraft.

In operation, the jet ski 1 is positioned in an upright condition above the ground either by use of an overhead hoist or by positioning the jet ski on a small cart which is specifically designed to transport the jet ski. In either case, the ends of the jet ski will project beyond the hoist or supporting cart. Rings 2 are then inserted over the respective ends of the jet ski, and the rings are connected together by the bars 3. The jet ski will normally be at a level above the ground such that the support bars 11 and 12 will rest on the respective ends of the jet ski. The take-up belts 19 are then operated to clamp the ends of the jet ski against the respective support bars 11 and 12. With the jet ski securely clamped to the rings 2, the supporting overhead hoist or cart can then be removed so that the jet ski is supported by the rings 2. At this time, flats 6 are engaged with the ground and prevent free rotation of the rings, as seen in FIG. 1.

The rings 2 are then manually rolled over the ground to a position where the flats 7 engage the ground and will maintain the rings against free rotation. In this position, as shown in FIG. 2, the jet ski is inverted and is in a position where straps 19 can be removed and repair work can be done on the bottom of the jet ski body or on the mechanical components of the jet ski located along the bottom. Wheels 24 permit the entire unit to be moved over the ground, if desired.

When the repair work has been completed, the straps 19, if removed, are replaced and the rings are again rolled manually over the ground to a position where the flats 7 face upwardly and the jet ski will then be in an upright position. To remove the jet ski from the rings, the central portion of the jet ski is engaged with an overhead hoist or supporting cart, the take-up belts 19 are loosened and the rings 2 moved axially to withdraw the rings from the ends of the jet ski.

The invention provides a simple and inexpensive device for inverting a heavy article such as a jet ski, other water craft, or snowmobile. The jet ski can be readily moved to an inverted by a single man operation, and does not require any power equipment.

The flats 6 and 7 will maintain the rings against free rotation, and while the drawings show each ring having a pair of flats, it is contemplated that any number of flats, or other non-circular sections, can be utilized so that the jet ski can be positioned at various orientations for repair or service. For example, each ring could include four flats located 90° apart which would enable the jet ski to be maintained not only at an upright and an inverted position, but also at two intermediate positions where the sides of the jet ski face upwardly.

The support bars 11 and 12 can be readily removed from the ring and replaced with other support bars having different configurations to accommodate different shapes or sizes of jet skis.

As the rings 2 are preferably formed of two semi-circular sections, the apparatus can be broken down into a more compact size for shipping and handling.

Various modes of carrying out the invention are contemplated as being within the scope of the following claims particularly pointing out and distinctly claiming the subject matter which is regarded as the invention.

I claim:

1. An apparatus for servicing a watercraft having an upper surface and a lower hull, comprising a pair of rings disposed in spaced parallel relation, a plurality of longitudinal adjustable connecting member connecting said rings together, each ring having a first flat portion and a second flat portion located diametrically opposite the first flat portion, the first flat portions of said rings lying in a first common plane and the second flat portions of the rings lying in a second common plane, a rigid support connected to each ring, each rigid support being secured to circumferentially spaced portions of the respective ring and disposed generally parallel to said flat portions, said supports disposed to engage the upper surface of said watercraft, and adjustable flexible clamping means connected to each ring and disposed to engage the hull of the watercraft and clamp the watercraft against said rigid supports, each clamping means being secured to circumferentially spaced locations on the respective ring, at least one of said rigid supports having a recess, said recess having an open side disposed to receive the upper surface of the watercraft and facing the corresponding flexible clamping means, said rings being manually rotatable from a first position where said first flat portions are engaged with a supporting surface and said watercraft is upright to a second position where the second flat portions are engaged with said surface and said watercraft is inverted.

2. The apparatus of claim 1, wherein at least one of said rings is slidable relative to said connecting members, sliding said one ring relative to said connecting members serving to vary the distance between said rings.

3. The apparatus of claim 2, and including locking means for locking said one ring relative to said connecting members.

4. The apparatus of claim 1, and including a cushioning pad secured to each support, said pad covering the recess.

5. The apparatus of claim 1, and including a plurality of wheels operably connected to said first flat portions for permitting movement of said apparatus on a supporting structure.

6. The apparatus of claim 1, wherein said one support comprises a pair of axially aligned generally straight end sections each connected to said ring, said one support also including a central U-shaped section connecting aligned inner ends of said end sections, said U-shaped section comprising said recess.

7. A rotatable apparatus for servicing an article, comprising a pair of rings disposed in spaced axially aligned relation, connecting means for connecting the rings in said axially aligned relation, each ring composed of a pair of semi-circular sections, each semi-circular section including a central curved portion and a pair of straight end portions extending outwardly from the ends of the curved portion, the end portions of one section being disposed in abutting relation to the end portions of the other section to provide each ring with a first flat area and a second diametrically opposed second flat area, a first flat area of one ring lying in a common plane with a first flat area of a second ring and a second flat area of one ring lying in a common plane with a second flat area of the other ring, attaching means for attaching the abutting end portions of said semi-cylindrical sections of each ring together, and clamping means for clamping an article to be serviced within the aligned rings, said rings being manually rotatable from a first position where said first flat areas are engaged with a supporting surface to a second position where the second flat areas are engaged with said surface.

8. The apparatus of claim 7, wherein, said attaching means comprises an attaching member disposed in telescopic sliding relation with said abutting end portions.

9. An apparatus for servicing an article, comprising a pair of rings disposed in spaced parallel relation, a plurality of longitudinal adjustable connecting members connecting said rings together, each ring having a first flat portion and a second flat portion located diametrically opposite the first flat portion, the first flat portions of said rings lying in a first common plane and the second flat portions of the rings lying in a second common plane, one of said adjustable connecting members connecting the first flat portion of one ring to the first flat portion of the other ring and a second of said connecting members connecting the second flat portion of one ring to the second flat portion of the other ring, a rigid support connected to each ring, each rigid support being secured to circumferentially spaced portions of the respective ring and disposed generally parallel to said flat portions, said supports disposed to support an article to be serviced, and adjustable flexible clamping means connected to each ring for clamping the article against said rigid support, each clamping means being secured to circumferentially spaced locations on the respective ring, at least one of said rigid supports having a recess, said recess having an open side facing the corresponding flexible clamping means and disposed to receive an end of said article, said rings being manually rotatable from a first position where said first flat portions are engaged with a supporting surface to a second position where the second flat portions are engaged with said surface.

* * * * *

UNITED STATES PATENT AND TRADEMARK OFFICE
CERTIFICATE OF CORRECTION

PATENT NO. : 5,328,161
DATED : July 12, 1994
INVENTOR(S) : ANDREW G. STUCK

It is certified that error appears in the above-indentified patent and that said Letters Patent is hereby corrected as shown below: Title page, At "[56] References Cited U.S. PATENT DOCUMENTS" INSERT --4,686,925  8/1987  Stuck  114/224--; Col. 4, Line 57, CLAIM 1, Cancel "member" and substitute therefor --members--

Signed and Sealed this

Twenty-second Day of November, 1994

Attest:

BRUCE LEHMAN

*Attesting Officer*        *Commissioner of Patents and Trademarks*